No. 862,070. PATENTED JULY 30, 1907.
E. GRIEDER.
ADJUSTABLE FRICTION BELT FOR AUTOMOBILE TIRES.
APPLICATION FILED MAR. 23, 1906.
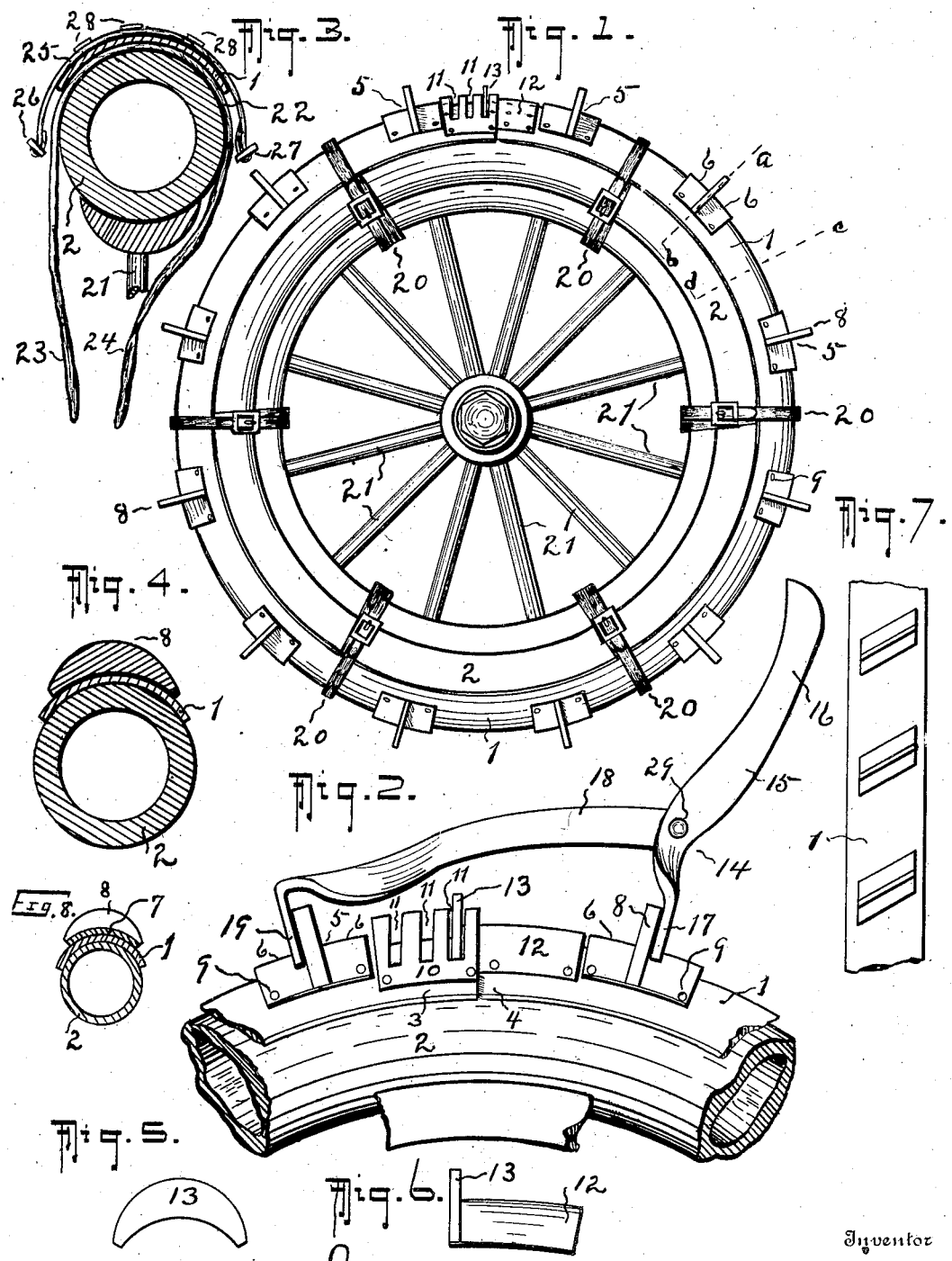

UNITED STATES PATENT OFFICE.

EMIL GRIEDER, OF WOODBINE, IOWA, ASSIGNOR OF ONE-HALF TO E. J. COLE, OF WOODBINE, IOWA.

ADJUSTABLE FRICTION-BELT FOR AUTOMOBILE-TIRES.

No. 862,070.  Specification of Letters Patent.  Patented July 30, 1907.

Application filed March 23, 1906. Serial No. 307,624.

*To all whom it may concern:*

Be it known that EMIL GRIEDER, a citizen of the United States, residing at Woodbine, in the county of Harrison and State of Iowa, has invented certain new and useful Improvements in Adjustable Friction-Belts for Automobile-Tires, of which the following is a specification.

My invention relates to improvements in adjustable friction belt for automobile tires, and the object of the invention is to provide a covering which may be readily applied and secured to the periphery of the tire, without raising the wheel, and which will operate to prevent slipping while traveling on muddy roads, or on ice, and which will operate in a large measure to prevent cutting or puncturing of the tire; also to provide securing means for fastening the cover upon the wheel, which will operate in a manner so that the covering may be quickly detached.

The invention has especial reference to an article which may be manufactured at very little expense, comparatively, and which has a facility of adjustment to wheels of different diameters, and to such a construction that, in its use, the resiliency of the cushion will not be lessened.

With these and other objects in view the invention presents a novel construction and many useful features, as disclosed herein and as illustrated by the drawings, wherein,—

Figure 1 represents a side view of a vehicle wheel with my invention operatively mounted thereon. Fig. 2 is a detail of Fig. 1, the parts being somewhat enlarged to clearly show adjustable devices. Fig. 3 is a sectional view of a cushion tire of a vehicle wheel employing my invention, introduced to show arrangement of straps. Fig. 4 is a view sectioned as on line *a b*, of Fig. 1, to clearly show the extent of tire surface inclosed by the protecting cover. Fig. 5 is a detail of Fig. 6, to exhibit contour of the locking lug, also contour of the friction lug. Fig. 6 represents a side view of plate 12 and locking lug 13, showing an integral construction. Fig. 7 represents a diagonal arrangement of friction lugs, being a modification in formation and seating these lugs. Fig. 8 is a view sectioned as on line *c d* of Fig. 1, somewhat reduced, to illustrate transverse curvature of portion 6 of friction members 5.

In the drawings the numeral 1 represents a band or belt mounted upon the periphery of the cushion-tire 2 of a vehicle wheel; this belt is preferably constructed of leather or rubber, but any tough substance similar thereto having a slight degree of elasticity may be employed. End 3 of the belt is adapted to overlap end 4 thereof, to some extent, as when used upon small wheels, and the belt, when mounted, conforms to the lengthwise and transverse curvature of the cushion tire.

At substantially regular intervals upon the outer surface of the belt are mounted bearing-plates 5 provided with lengthwise curved body-portions 6 (Fig. 2.), these being also curved transversely as clearly shown at 7, Fig. 8; the bearing-plates therefore conform to all curves upon the surface of belt 1 when said belt is operatively seated; and bearing-plates 5 are provided with the transversely curved friction-lug 8 integrally formed upon the lengthwise and transversely curved body-portion 6, and outwardly-extending therefrom. The bearing-plates are securely mounted, preferably by means of rivets 9 upon the belt, and, as a locking means, I securely mount as by means of rivets, the plate 10 having the series of slots 11 formed transversely therein; securely upon the opposite end of belt 1 is mounted the plate 12, having the outwardly extending lug 13 adapted to engage, on occasion, any one of slots 11.

From the description thus given the function of the several parts will be readily understood. The belt may be very quickly placed in operative position upon an automobile wheel, and afterwards may readily be removed. After placing the belt upon the periphery of the cushion tire a stretching of said belt is accomplished by causing a movement toward each other of lugs 8 nearest the terminals of the belt; and this may be effected in any convenient manner, as by use of the compression tool 14 shown in Fig. 2. This instrument is provided with a bar 15 upon one end of which is formed a handle 16, the opposite end terminating in the claw 17; and upon the body of the bar between the handle and claw 17, is pivotally mounted at 29 the draw-bar 18, terminating in claw 19; and it will be understood that a well known movement of handle 16, when thus positioned, will effectually control the movements of the ends 3 and 4 in a lengthwise direction, of belt 1, and, when instrument 14 is used and a compression is effected as described, plate 10 may be raised outwardly from the surface of cushion 2, carrying with it the end 3 of the belt, and upon further compression lug 13 may be made to occupy any one of the series of slots 11, as desired, thus securely locking the parts in a strained or taut position.

The invention is very useful when traveling in the country where muddy roads may be traversed and steep grades encountered since smooth tires will not always engage a slippery road-surface. This invention is intended for use in emergencies of this kind; and at such time the belt may be operatively mounted without raising the wheel; the belt is first extended lengthwise upon the ground, the wheel may then be driven upon the belt, and by means already mentioned, may be firmly positioned upon the periphery of the wheel and locked thereon. By means of straps 20, preferably of leather, interposed between spokes 21, the belt is prevented from slipping upon the surface of cushion 2. I find a convenient and effective means for this purpose to be the employment of a band or strap portion 22 (Fig. 3.) having the ends 23 and 24, and to employ a strap-portion 25 provided with buckles 26 and 27, between these portions being interposed the belt 1, all securely formed as a unit, as by use of rivets 28; the end 23 being then secured to buckle 27 and end 34 secured to buckle 26, which construction affords the greatest strength for the limited space to be occupied.

It will be noted that the invention may be constructed very economically, the parts being few and simple. The belt, being flexible may be rolled into compact shape to occupy a very small amount of space in the carrying outfit of the automobile, and, on occasion, may be readily mounted upon the wheel. It will also be observed that this friction-belt is adapted to a mounting upon wheels of different diameters, and the resiliency of the wheel is not diminished when the belt is mounted thereon.

What I claim as my invention is,—

1. A friction device for vehicle cushion tires, comprising a flexible belt secured non-slipping upon the periphery of the tire, and having secured thereon at regular intervals a series of outer lengthwise-and-transversely-curved bearing-plates, and having terminal ends; each of said outer lengthwise-and-transversely-curved bearing-plates having secured thereon an outwardly-extending friction-lug formed with a transverse curvature, with reference to the friction belt; a lengthwise-extending transversely-curved plate secured upon the outer side of the flexible belt near one of its terminals and having a transversely formed slot therein, a lengthwise-extending transversely-curved plate secured upon the outer side of the flexible belt near its opposite terminal and having an outwardly-extending transverse lug formed upon its outer end adapted to have a seating within said transversely-formed slot.

2. A friction device for vehicle cushion tires, comprising a flexible belt having terminal ends and secured non-slipping upon the periphery of the tire, and having secured thereon a series of outer lengthwise-extending transversely-curved bearing-plates; each of said outer lengthwise-extending transversely-curved bearing-plates having secured thereon an outwardly-extending friction-lug formed with a transverse curvature; a lengthwise-extending plate secured upon the outer side of the flexible belt near one of its terminals and having a slot formed therein; a lengthwise-extending plate secured upon the outer side of the flexible belt near its opposite terminal and having an outwardly-extending lug formed upon its outer end adapted to have a seating within said slot.

3. A device for the purpose described, in combination, comprising a vehicle tire, a flexible belt having terminal ends, a first flexible securing member and a second flexible securing member; said flexible belt being seated upon the periphery of the vehicle tire and having outwardly-extending friction lugs secured thereon; said first flexible securing member transversely traversing the outer face of the vehicle tire, said second flexible securing member connected with said first flexible securing member and transversely traversing the outer face of the flexible belt; and means to secure the terminal ends of said flexible belt.

4. A device for the purpose described, in combination, comprising a vehicle tire, a flexible belt having terminal ends, a first flexible securing member and a second flexible securing member; said flexible belt being seated upon the periphery of the vehicle tire and having outwardly-extending friction-lugs secured thereon; said first flexible securing member seated upon and transversely traversing the outer face of the vehicle tire, said second flexible securing member seated upon and transversely traversing the outer face of the flexible belt, and having a connection with said first flexible securing member; and means to secure the terminal ends of said flexible belt.

5. A device for the purpose described, in combination, comprising a flexible tire; a flexible belt seated upon the periphery of the vehicle tire and having outwardly-extending friction lugs secured thereon; a first flexible securing member and a second flexible securing member; said first flexible securing member seated upon and transversely traversing the outer face of the vehicle tire between the planes of said outwardly-extending friction lugs, said second flexible securing member seated upon and transversely traversing the outer face of the flexible belt between the planes of the outwardly-extending friction lugs, and having a connection with said first flexible securing member.

In testimony whereof I have affixed my signature in presence of two witnesses.

EMIL GRIEDER

Witnesses:
 LEON F. BECKER,
 RAY MEFFERD.